(12) United States Patent
Blanco et al.

(10) Patent No.: US 8,582,563 B2
(45) Date of Patent: Nov. 12, 2013

(54) GROUPING OF USER IDENTITIES IN AN IP MULTIMEDIA SUBSYSTEM

(75) Inventors: Germán Blanco, Paracuellos del Jarama (ES); Jesus Javier Arauz Rosado, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 653 days.

(21) Appl. No.: 12/738,903

(22) PCT Filed: Oct. 26, 2007

(86) PCT No.: PCT/EP2007/061565
§ 371 (c)(1),
(2), (4) Date: Apr. 20, 2010

(87) PCT Pub. No.: WO2009/052870
PCT Pub. Date: Apr. 30, 2009

(65) Prior Publication Data
US 2010/0232422 A1 Sep. 16, 2010

(51) Int. Cl.
*H04L 12/66* (2006.01)
*H04L 12/28* (2006.01)
*H04W 4/00* (2009.01)
*G06F 15/16* (2006.01)

(52) U.S. Cl.
USPC ......... 370/352; 455/435.1; 370/389; 709/228

(58) Field of Classification Search
USPC ......... 709/228; 455/435.1; 370/352–356, 389
See application file for complete search history.

(56) References Cited

U.S. PATENT DOCUMENTS

2005/0136926 A1* 6/2005 Tammi et al. ............ 455/435.1
2012/0219127 A1* 8/2012 Lu et al. ..................... 379/88.17

OTHER PUBLICATIONS

3rd Generation Partnership Project: "Technical Specification Group Services and System Aspects; IP Multimedia Subsystem (IMS); Stage 2 (Release 8)" 3GPP TS 23.228 V8.2.0, [Online] Sep. 2007, pp. 52-63, XP002500172 Internet Retrieved from the Internet: URL:http://www.3gpp.org/ftp/Specs/archive/23_228/23228-820.zip>, [retrieved on Oct. 17, 2008] p. 52-p. 60.
"3rd Generation Partnership Project: Technical Specification Group Core Network and Terminals: Cx and Dx interfaces based on the Diameter protocol; Protocol details (release 7)" 3GPPP TS 29.229 V7.5.0 Mar. 1, 2007, pp. 1-28, XP002495878 p. 7-p. 10, p. 14-p. 23.

* cited by examiner

*Primary Examiner* — Asad Nawaz
*Assistant Examiner* — Joel Hamel

(57) ABSTRACT

The present invention is aimed to provide a more flexible data structure where any IMPU, even those of the SIP URI type, may be shared by more than one IRS in order to simplify the registration of an IMPU for users of a Fixed-Mobile Convergent network. To this end, there is provided a flexible data structure wherein a number n of IMPUs of a user may be distributed in a number m of Implicit Registration Sets, wherein a given IMPU may be shared by more than one IRS, each IRS is associated with an access condition, and the explicit registration of said given IMPU under a given access condition triggers the implicit registration of those IMPUs in the IRS associated with said access condition, while the registration status of IMPUs in any other IRS remain unchanged.

23 Claims, 10 Drawing Sheets

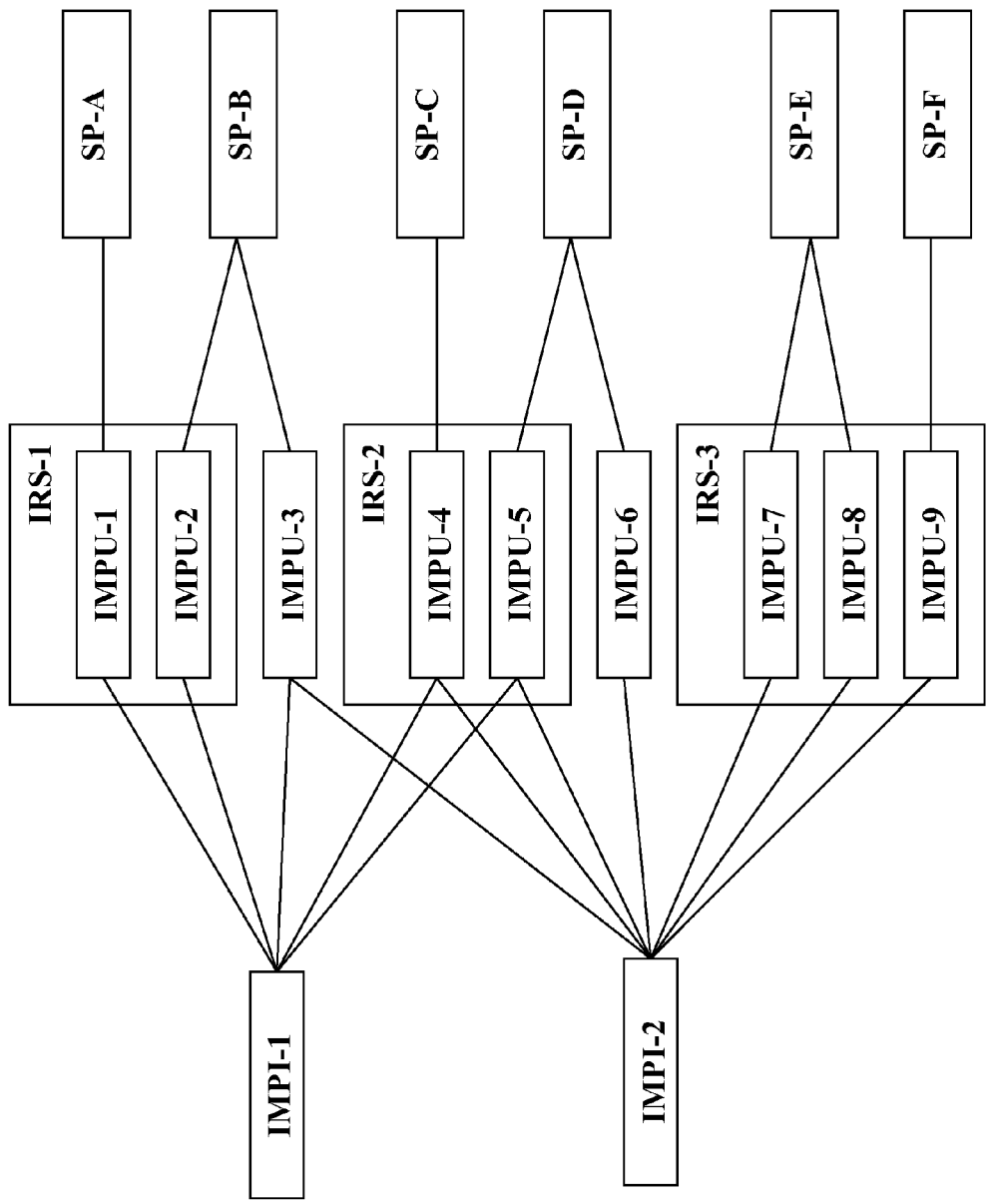
FIG.-1 - *Prior art*

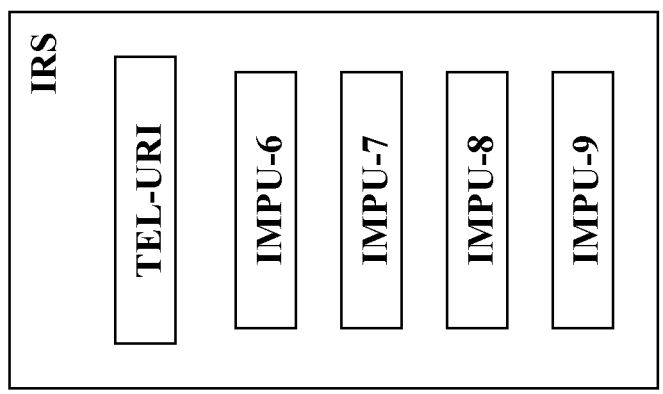
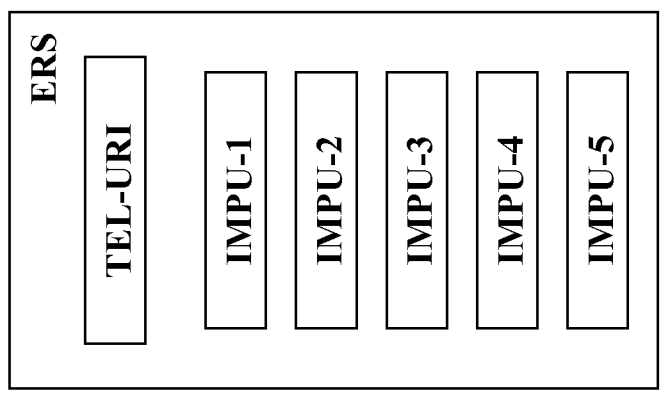
FIG.-2- *Prior art*

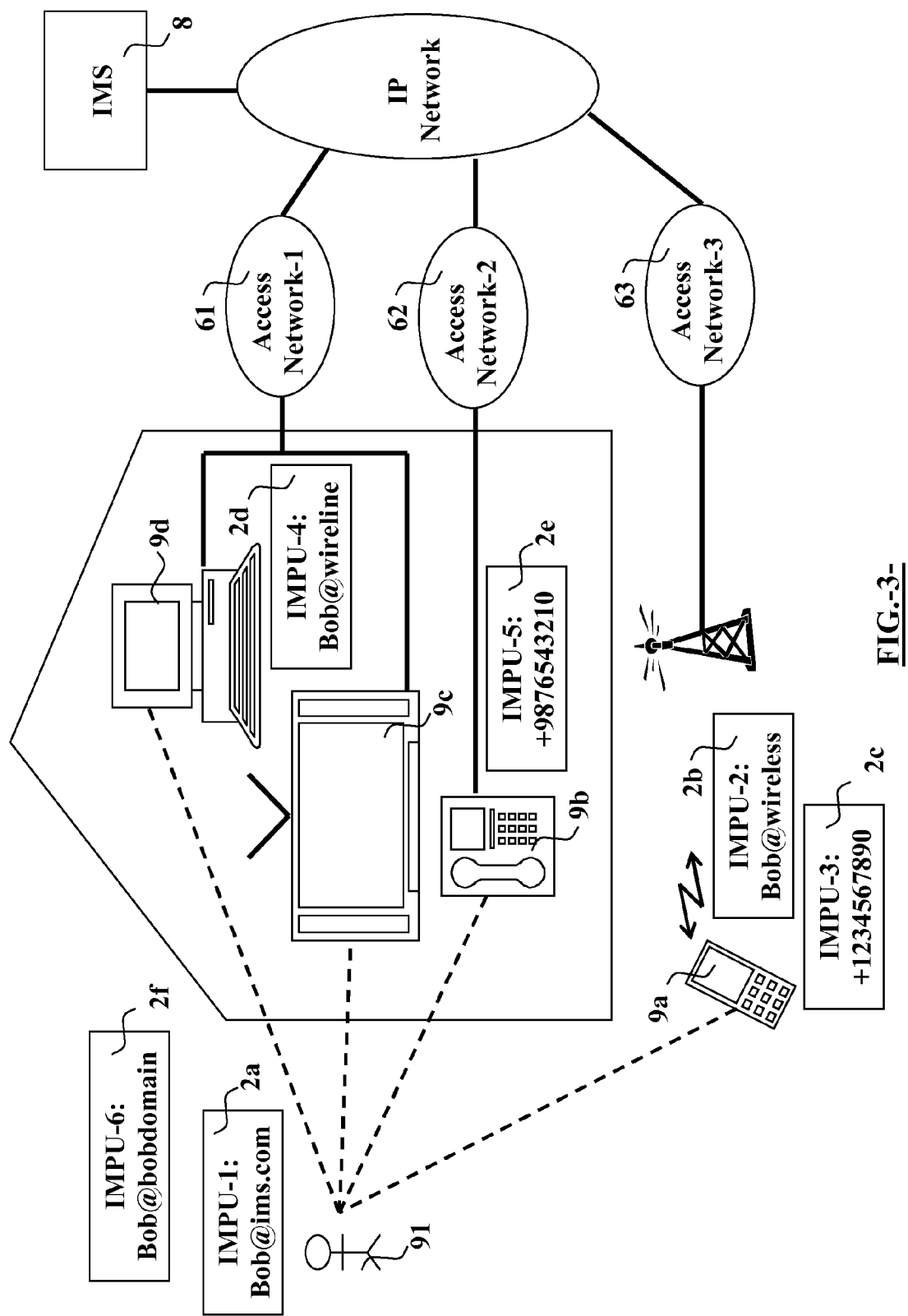
FIG.-3-

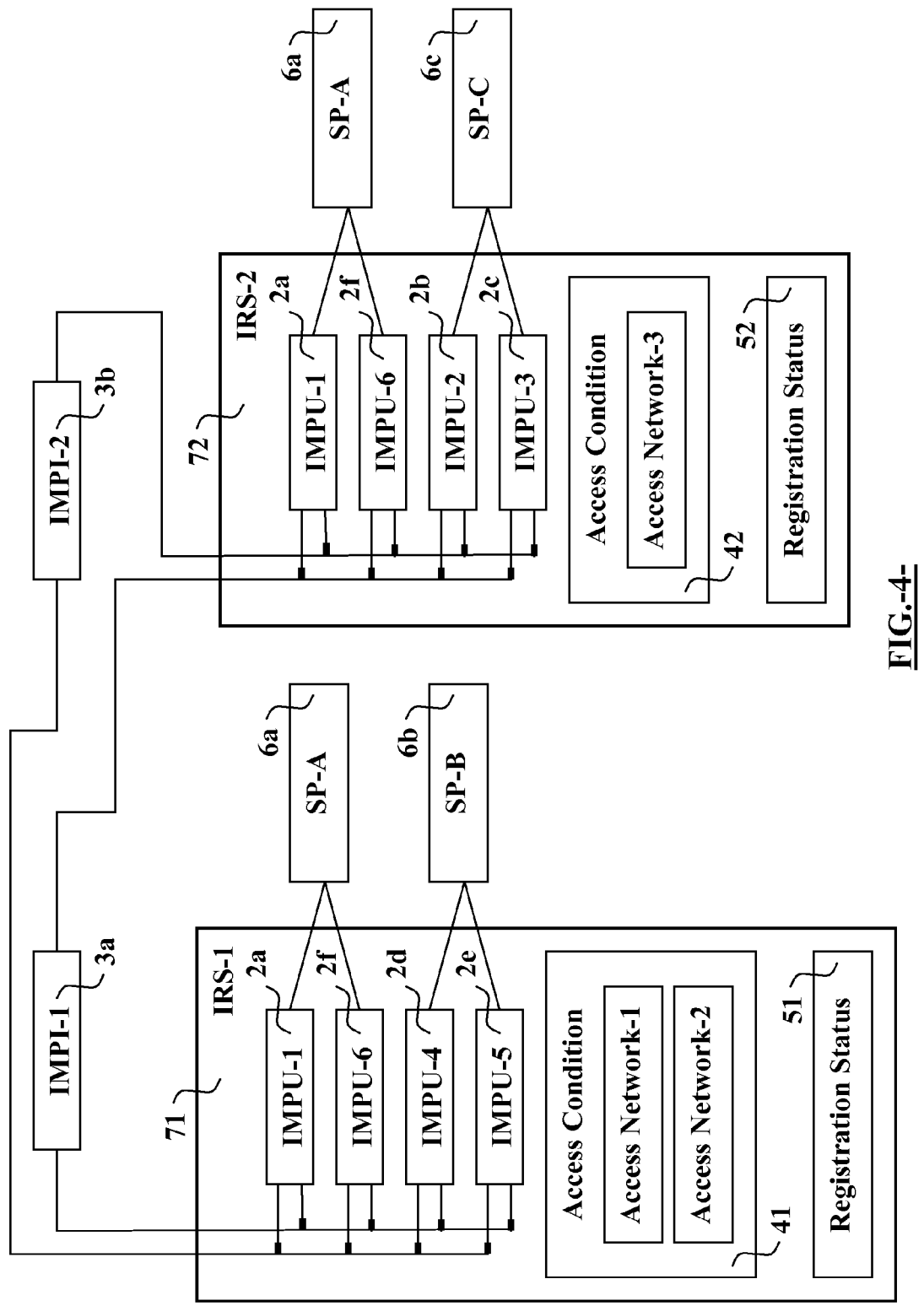
FIG.-4-

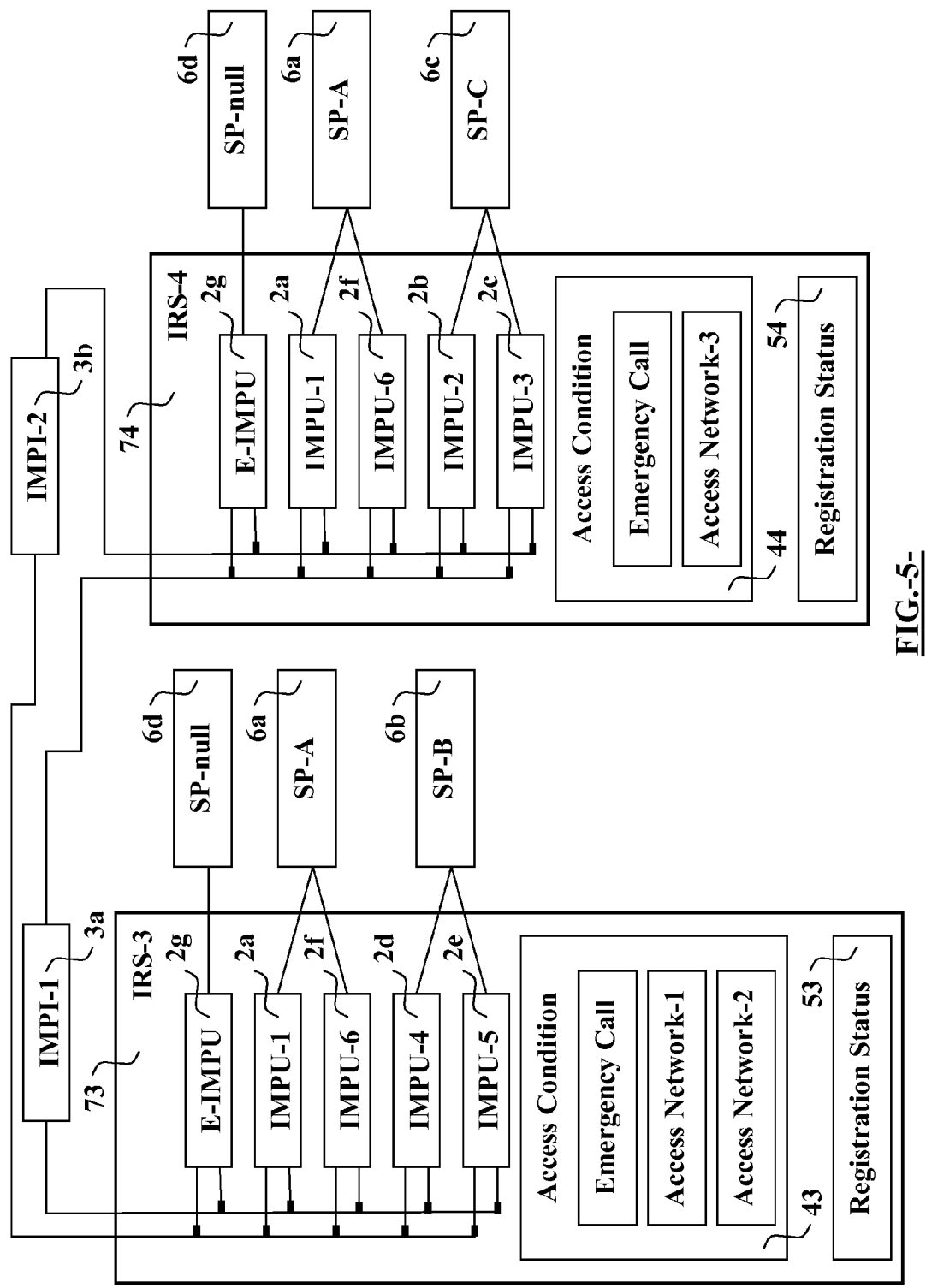
FIG.-5-

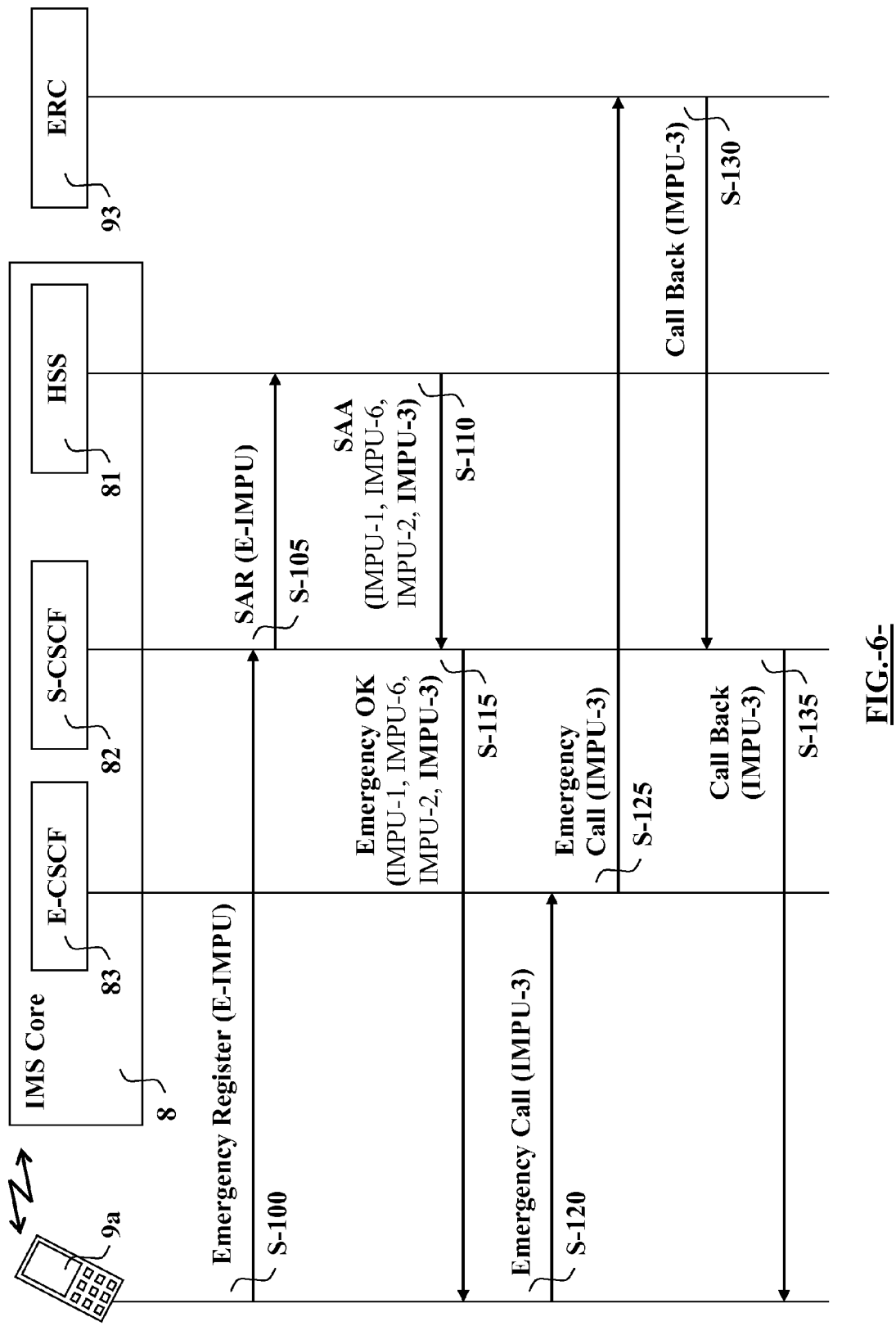
FIG.-6-

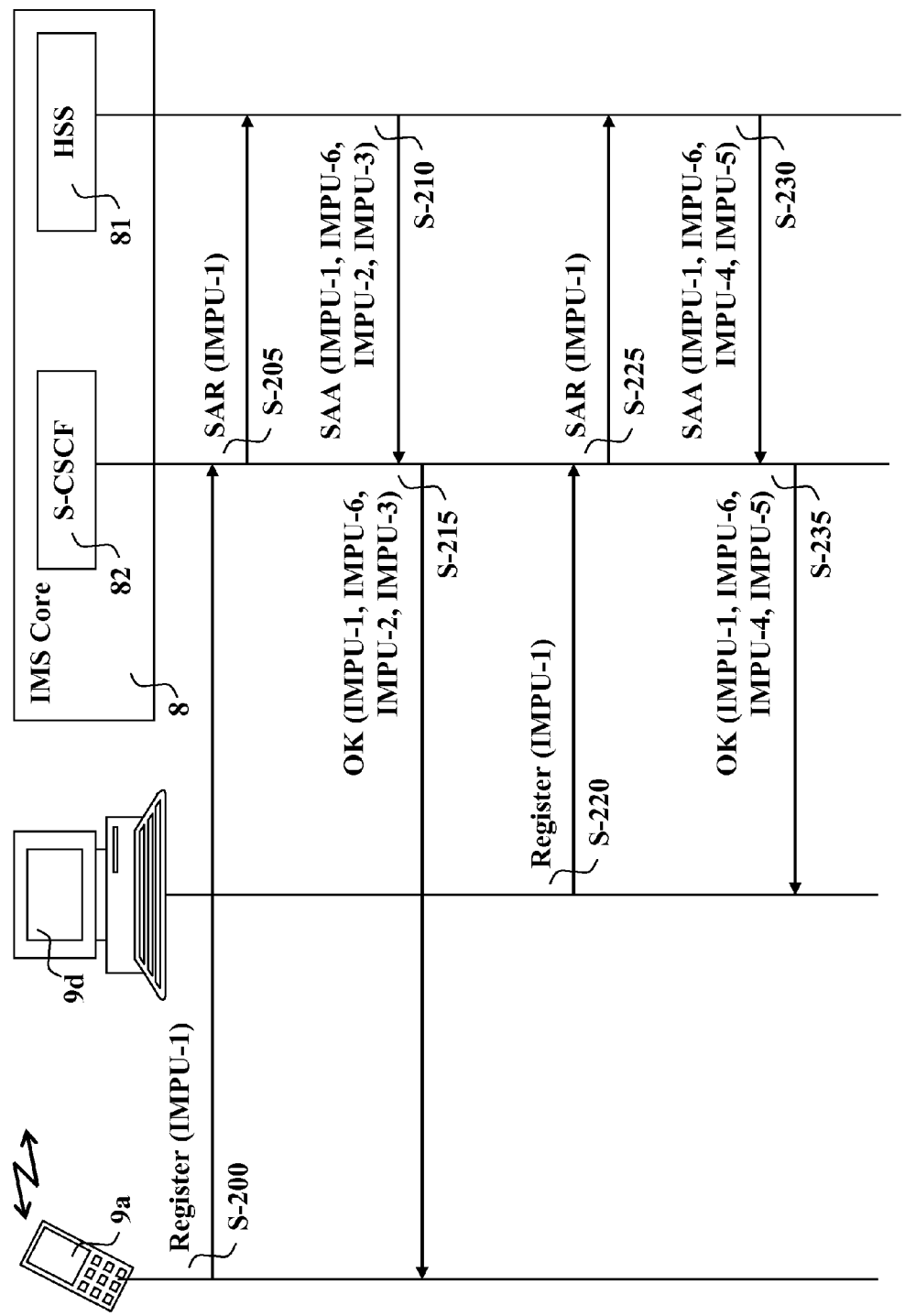
FIG.-7-

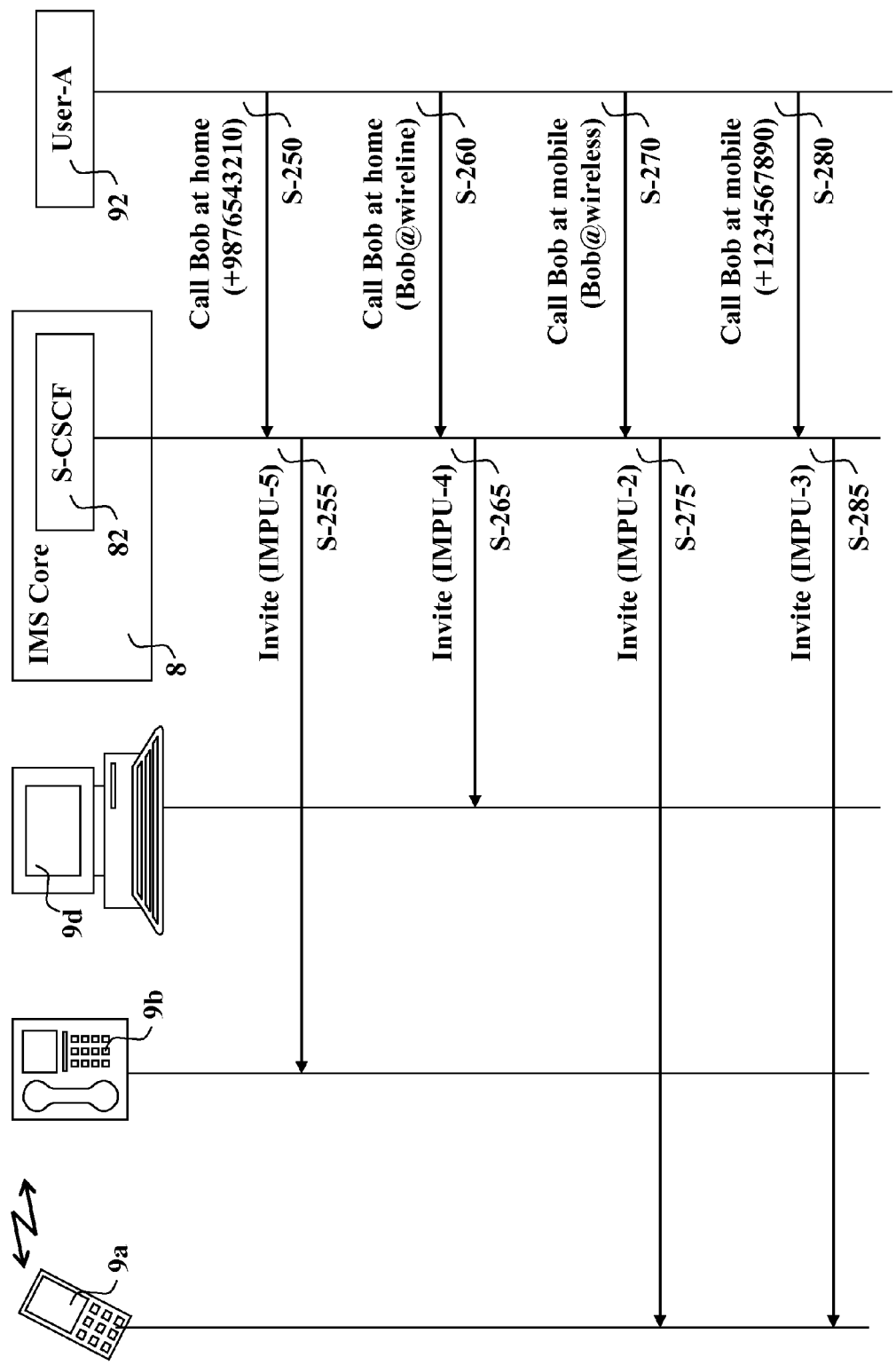
FIG.-8-

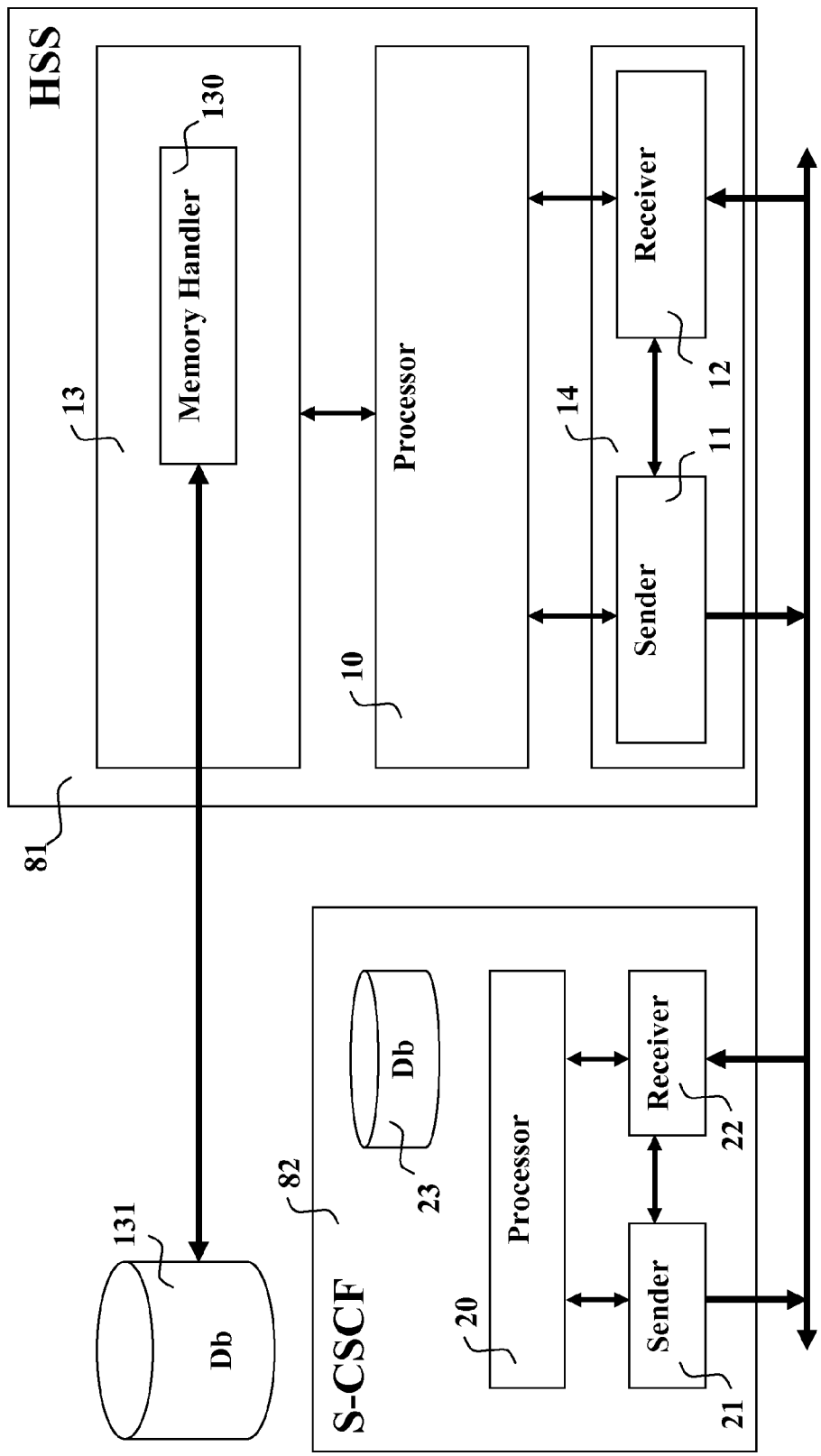

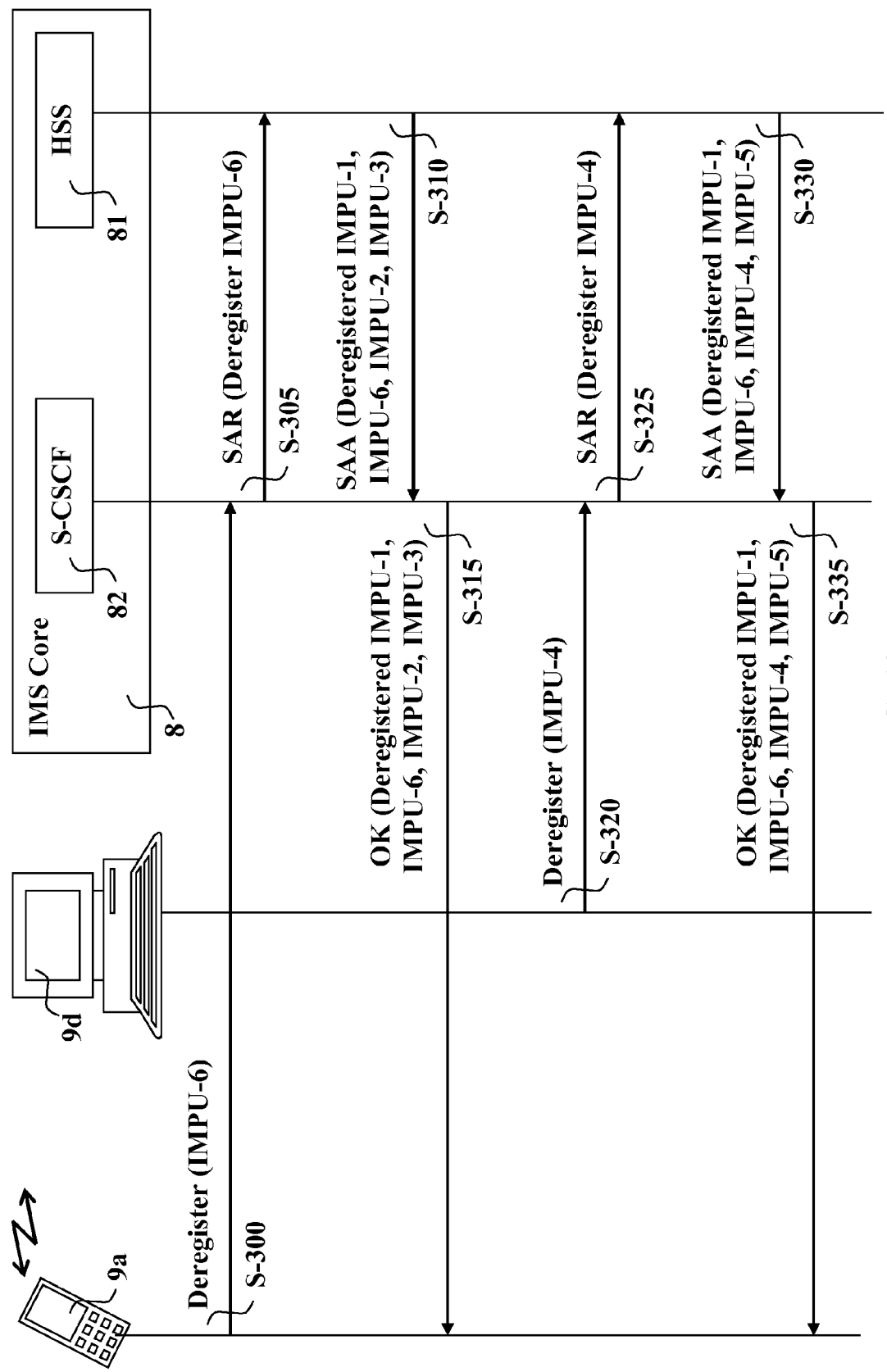
FIG.-10-

GROUPING OF USER IDENTITIES IN AN IP MULTIMEDIA SUBSYSTEM

TECHNICAL FIELD

The present invention generally relates to implicit registration of public user identities in an IP Multimedia Subsystem and, in particular, where applied in a fixed-mobile convergent scenario.

BACKGROUND

In accordance with 3GPP technical specifications, namely TS 23.228, every user subscription of the IP Multimedia Subsystem (hereinafter IMS) is assigned one or more IMS Private User Identities by the Home network operator. Each IMS Private User Identity (hereinafter IMPI) is used for registration of the user in the IMS, and may be associated with one or more IMS Public User Identities. Each IMS Public User Identity (hereinafter IMPU) is used by the user for communications with other users and may be associated with a unique IMS Service Profile (hereinafter SP) and with one or more IMPIs. In this respect, any SP may be associated with more than one IMPU, whereas each IMPU can only be associated with one SP. An SP being, in short, a collection of service and user related data.

At present, a plurality of IMPUs may be included in an Implicit Registration Set (hereinafter IRS) wherein all the IMPUs share a same registration status and are associated with a same set of IMPIs. Thus, where an IMPI/IMPU pair is explicitly registered or deregistered, and the IMPU belongs to an IRS, all the IMPUs in the IRS are simultaneously considered implicitly registered or de-registered by the network without requiring explicit registration or de-registration for all of them. For the purpose of the present invention, where several IMPUs share a single SP and are included in a same IRS, said several IMPUs are considered to be aliases.

In accordance with the above understanding of an IRS, wherein all the IMPUs share a same registration status and are associated with a same set of IMPIs, one infers that an IMPU can only belong to one IRS. Otherwise, where the IMPU is included in two IRSs, all the IMPUs in the two IRSs would have the same registration state, so that it would effectively be just one IRS. Or putting it in another way, two different IRSs imply two sets of IMPUs having a different registration state; so that any IMPU in the two IRSs would have two different registration states at the same time, which is not possible.

The exemplary data structure illustrated in FIG. 1 shows a subscription with two IMPIs, namely IMPI-1 and IMPI-2, nine IMPUs, namely IMPU-1 to IMPU-9, and three IRSs, namely IRS-1 to IRS-3, in which some of the IMPUs are distributed and wherein all the IMPUs in each IRS are associated with the same at least one IMPI. In this exemplary data structure, IMPU-3 is associated with IMPI-1 and IMPI-2, whereas IMPU-6 is only associated with IMPI-2. In this situation, IMPU-3 may be registered using any of IMPI-1 or IMPI-2, whereas IMPU-6 can only be registered using IMPI-2.

Also in this exemplary data structure, IRS-1 consists of IMPU-1 and IMPU-2 both only associated with IMPI-1, so that the explicit registration of either IMPU-1 or IMPU-2 can only be carried out with IMPI-1, and triggers the implicit registration of either IMPU-2 or IMPU-1 respectively. The IRS-2, however, consists of IMPU-4 and IMPU-5 both individually associated with both IMPI-1 and IMPI-2, so that the explicit registration of either IMPU-1 or IMPU-2 can be carried out either with IMPI-1 or with IMPI-2, and triggers the implicit registration of either IMPU-2 or IMPU-1 respectively and for the same either IMPI-1 or IMPI-2. The IRS-3, on the other hand, consists of IMPU-7, IMPU-8 and IMPU-9 all only associated with IMPI-2, so that the explicit registration of either IMPU-7, IMPU-8 or IMPU-9 can only be carried out with IMPI-2, and triggers the implicit registration of all the three IMPUs. In particular, since IMPU-7 and IMPU-8 are both associated with a unique SP, namely SP-E in this FIG. 1, and given that both IMPU-7 and IMPU-8 are included in the same IRS, namely IRS-3, both IMPU-7 and IMPU-8 are said to be alias to each other, and they can be used indistinctly since the treatment made by the network is the same for both.

Once the above exemplary data structure with the conventional relationships between IMPUs, IMPIs, IRSs and SPs has been presented, a rationale for introducing the IRS may be worthwhile. On the one hand, IMS makes use of the so-called Session Initiation Protocol (hereinafter SIP), wherein user identifiers are preferably in the form of a so-called SIP URI, such as 'sip: user@ims.com'. On the other hand, users of a wireline telephony network are generally identified by a subscriber number in the form of a so-called TEL URI, such as 'tel: +987656789'. In accordance with the IETF SIP specification, a TEL URI cannot be explicitly registered. However, users of the IMS should also be reachable with a TEL URI, especially in the context of emergency calls. To overcome this, the concept of IRS was introduced to allow a set of IMPUs in the form of TEL URI and SIP URI being implicitly registered upon the explicit registration of an IMPU of said IRS, said IMPU in the form of a SIP URI. Even though SIP URI and TEL URI are formally expressed with a respective prefix as indicated above 'sip: user@ims.com' and 'tel: +987656789' respectively, in the following, and for the sake of simplicity, they are simply referred to as 'user@ims.com' and '+987656789' respectively.

When considering a fixed-mobile convergent network (hereinafter FMC) for accessing the IMS, a user may have IMPUs of a SIP URI type, such as bob@wireline and bob@wireless, and IMPUs of a TEL URI type, such as +1234567890 identifying a mobile terminal and +9876543210 identifying a wireline terminal. Such FMC user may have: a mobile handset reachable by an MSISDN, and having a so-called SIP User Agent (hereinafter SIP UA); a wireline telephone reachable with an E.164 subscriber number; a desktop Personal Computer (hereinafter PC) with a software-based SIP UA; and likely an IPTV set-top box (hereinafter STB) with an embedded SIP UA. Moreover, different TEL URIs are necessary for wireline and mobile terminals since calls from another operator network typically have a lower cost where calling to a wireline terminal than the cost of that same call to a mobile terminal and thus the calling user should be given the choice of dialling a wireline terminal or a mobile terminal.

Thus, this FMC user may be given under the conventional data structure illustrated in FIG. 1 a first IRS with a first IMPU +9876543210 of the TEL URI type identifying the wireline terminal and a second IMPU bob@wireline of the SIP URI type identifying, for example, the desktop Personal Computer (hereinafter PC) and likely the IPTV STB; and a second IRS with a first IMPU +1234567890 of the TEL URI type, namely an MSISDN, identifying the mobile terminal and a second IMPU bob@wireless of the SIP URI type identifying the SIP UA in the mobile terminal. In operation, where the SIP UA in the mobile terminal registers the IMPU bob@wireless, the network automatically registers the IMPU +1234567890 of the TEL URI type representing the mobile terminal MSISDN number. Also in operation, where the SIP UA in either the desktop PC or the IPTV STB registers the IMPU bob@wireline, the network automatically registers the IMPU +9876543210 of the TEL URI type representing the wireline terminal ISDN number.

This FMC user may also have an IMPU of the SIP URI type identifying the user in the IMS, such as bob@ims.com, and even an alias IMPU of the SIP URI type also identifying the user in the IMS, such as bob@bobdomain. At present, these two IMPUs identifying the user in the IMS may preferably be included in a third IRS under the above data structure, and cannot be defined in both IRSs discussed above for the wireline and wireless environments since they might have a different registration status depending on what implicit registration has taken place in operation. Therefore, the user should firstly register the wireline or wireless IRS, and then make a successive registration of the IMPU bob@ims.com.

On the other hand, within the context of emergency calls through the IMS, regulatory requirements impose that each terminal performing a call to an emergency response centre (hereinafter ERC) must be reachable via a plain E.164 number. At the same time, standardization bodies have agreed that where a not registered user registers with the objective of initiating an emergency call, this user must use a so-called "Emergency Public Identity" (hereinafter E-IMPU) which is a SIP URI different from any other IMPU associated with the user. From this background, one may infer that the E.164 number for emergency calls, as mandated by regulatory requirements, cannot be the same as the MSISDN identifying the mobile terminal or the ISDN subscriber number identifying the wireline terminal, since that would imply that the MSISDN or ISDN subscriber number must be part of two different IRS at the same time, what is not possible nowadays. Thus, in order to accomplish the regulatory requirements, an additional TEL URI may be assigned with the E.164 number for each user that can only be used for emergency calls.

This apparent first solution forces the reservation of one additional identifier, namely an emergency TEL URI, in addition to the above E-IMPU of the SIP URI type for every subscriber. This identifiers can only be used for emergency calls, but the operator needs to request a much larger numbering space from the administration, and the above drawback of successive implicit registrations for users of a FMC network is even maximized. In addition, this solution implies that the ERC would see a different subscriber identifier for calling back the user where the user accesses the ERC from the IMS domain than where the user accesses the ERC from a conventional telephony domain, what may cause an additional difficulty in identifying the origin of the emergency call.

In attempting to overcome this, a second solution is nowadays under discussion in 3GPP standardization bodies, and whereby a TEL URI usable for emergency calls might be shared by more than one IRS, as in FIG. 2 illustrates. This second solution proposes a first IRS with IMPUs only usable for emergency calls and at least one second IRS with IMPUs non-usable for emergency calls, both IRSs sharing the TEL URI usable for emergency calls. In operation, where the user explicitly registers an IMPU of the SIP URI type in the IRS for emergency calls, all the IMPUs in said IRS including the TEL URI are implicitly registered for emergency calls, and this registration does not affect the registration state of the TEL URI and other IMPUs in other IRSs. Since the only IMPU shared by more than one IRS in this solution is of TEL URI type, and given that a TEL URI cannot be explicitly registered, this solution does not solve the above drawback of successive registrations for FMC users. Moreover, in view of this solution, the above FMC user may be given an IRS for emergency calls having as TEL URI either the +1234567890 representing the mobile terminal MSISDN number, or the +9876543210 representing the wireline terminal ISDN number, whilst the user is registered in the other environment respectively. In other words, this solution does not solve the problem of sharing IMPUs of the SIP URI type identifying the user in the IMS amongst more than one IRS.

SUMMARY

It is an object of the present invention to obviate at least some of the above disadvantages and provide for a more flexible grouping of user identities in the IMS. More specifically, and especially applicable to FMC users, the present invention is aimed to provide a more flexible data structure where any IMPU, even those of the SIP URI type, may be shared by more than one IRS.

The object above is generally accomplished in accordance with the invention by providing a Home Subscriber Server (hereinafter HSS) holding such flexible data structure per subscriber of the IMS, a method of carrying out the implicit registration of an IRS sharing a given IMPU with another IRS, and a Serving Call Session Control Function (hereinafter S-CSCF) server serving subscribers of the IMS and cooperating with the HSS to determine the IRS to be implicitly registered.

Thus, in accordance with a first aspect of the present invention, there is provided a HSS holding subscriber data of users of the IMS, this HSS having a data structure per subscriber that includes a plurality of IMPUs, each IMPU associated with at least one IMPI, wherein a number n of IMPUs is distributed in a number m of IRSs, and wherein all the IMPUs in each IRS share the same registration status. In this HSS, each IRS is associated with an access condition, a given IMPU is shared by more than one IRS, and the explicit registration of said given IMPU under a given access condition triggers the implicit registration of those IMPUs in the IRS associated with said access condition, whilst the registration status of IMPUs in any other IRS associated with a different access condition remain unchanged. Moreover, an explicit registration in this HSS of an IMPU, which belongs only to one IRS, also triggers an implicit registration of those IMPUs in said IRS for the associated access condition.

Generally speaking, and applicable to the HSS as well as to the S-CSCF and the method, the given access condition may be selected from a group of access conditions that includes: a mobile access only, a fixed access only, emergency call, roaming network, and combinations thereof. More specifically, an access condition may be built up by performing a logic operation with a combination of individual conditions such as an OR selection between several fixed access networks plus an AND with an emergency call condition.

In order to preclude partial deregistration of the IMPUs in an IRS, any implicit registration of IMPUs in the IRS is recorded in the HSS. Then, a deregistration of an IMPU in an IRS, which implicit registration was recorded, triggers the deregistration of those IMPUs in said IRS.

Regarding implementation, this HSS may comprise a storage for storing the data structure per subscriber; a receiver for receiving the explicit registration of the given IMPU under the given access condition; and a processor for triggering the implicit registration of IMPUs in the IRS associated with said access condition. This HSS may further comprise a sender for submitting those IMPUs in the IRS as a result of the explicit registration of the given IMPU.

In particular, the storage of this HSS may comprise a memory handler for submitting and retrieving data from an external database, or may directly include an internal database to this end.

Regarding above advantages, the processor of this HSS may be arranged for recording in the storage the implicit registration of IMPUs in any IRS in order to preclude partial deregistration of IMPUs in said IRS. Moreover, the receiver of this HSS may be arranged for receiving a deregistration of an IMPU in an IRS, which implicit registration was recorded in the storage, and the processor may be arranged for triggering the deregistration of those IMPUs in said IRS. Furthermore, the receiver of this HSS may further be arranged for receiving a given access condition along with a deregistration of an IMPU, and the processor may further be arranged for using the given access condition to determine a deregistration of those IMPUs in an IRS associated with said access condition.

In accordance with a second aspect of the present invention, there is provided a method of carrying out an implicit registration of one IRS amongst a plurality of IRSs in a HSS, wherein each IRS comprises more than one IMPU and the IMPUs in each IRS share a same registration status. This method comprises a step of distributing a number n of IMPUs in a number m of IRSs; a step of sharing a given IMPU by more than one IRS; a step of associating each IRS with an access condition; a step of carrying out a explicit registration of the given IMPU under a given access condition; and a step of triggering an implicit registration in the HSS of those IMPUs in an IRS associated with said given access condition, whilst the registration status of IMPUs in any other IRS associated with a different access condition remain unchanged. Moreover, this method may further comprise a step of carrying out a explicit registration of a second IMPU, which belongs only to one IRS, and a responsive step of triggering an implicit registration of those IMPUs in said IRS for the associated access condition.

Aligned with advantageous features provided for in the HSS, this method may further comprise a step of recording the implicit registration of IMPUs in any IRS, in order to preclude partial deregistration of IMPUs in said IRS. Moreover, this method may further comprise a step of deregistering those IMPUs in an IRS, which implicit registration was recorded, upon a deregistration of an IMPU in said IRS. Furthermore, this method may also comprise a step of receiving a given access condition along with a deregistration of an IMPU, and a step of using the given access condition to determine a deregistration of those IMPUs in an IRS associated with said access condition.

In accordance with a third aspect of the present invention, there is provided a S-CSCF serving subscribers of the IMS. This S-CSCF includes a receiver for receiving an explicit registration of an IMPU of a given subscriber, and a sender for submitting the explicit registration of said IMPU towards a HSS holding subscriber data for users of the IMS. In this S-CSCF, the sender is arranged for submitting a given access condition for which the explicit registration applies. Moreover, the sender may further be arranged for submitting towards the HSS, along with a deregistration of an IMPU, a given access condition for which the deregistration applies.

The invention may be practised by one or more computer programs, loadable into an internal memory of a number of computers, each one with input and output units as well as with a processing unit, the computer program comprising executable code adapted to carry out method steps according to any of claims 14 to 20 when running in the computer. The executable code of the one or more computer programs may be recorded in a carrier readable in a computer.

BRIEF DESCRIPTION OF THE DRAWINGS

The features, objects and advantages of the invention will become apparent by reading this description in conjunction with the accompanying drawings, in which:

FIG. 1 represents an exemplary distribution of IMPUs in IRSs in accordance with conventional subscriber data for IMS, whereby no IMPU can be shared by more than one IRS.

FIG. 2 represents another exemplary distribution of IMPUs in IRSs, in accordance with discussions currently held in standardization fora, whereby just an IMPU of a TEL URI type can be shared by more than one IRS, whilst no IMPU that can be explicitly registered can be shared by more than one IRS.

FIG. 3 illustrates an exemplary Fixed-Mobile Convergent network, wherein a user is given several IMPUs usable in a fixed or wireline environment, several IMPUs usable in a mobile or wireless environment, and several IMPUs usable for accessing the IMS through the fixed or mobile environment.

FIG. 4 illustrates an exemplary data structure whereby any IMPU can be shared by more than one IRS, and each IRS is associated with an access condition which matching during the explicit registration of an IMPU in the IRS triggers an implicit registration of those IMPUs in said IRS.

FIG. 5 illustrates an exemplary embodiment of the data structure applicable to emergency calls, and wherein a special emergency-IMPU is wanted to be shared by more than one IRS and to be used for explicit registration.

FIG. 6 illustrates an exemplary embodiment of a method for emergency calls where the exemplary data structure illustrated in FIG. 5 applies.

FIG. 7 illustrates an exemplary embodiment of a method for implicit registration of two different IRSs, each one associated with a particular access condition as illustrated in FIG. 4, upon a user registering an IMPU shared by both IRSs under respective access conditions.

FIG. 8 illustrates an exemplary embodiment of a possible sequence of calls carried out from another user to reach the user who had registered the two different IRSs as illustrated in FIG. 7.

FIG. 9 represents basic structural elements of a HSS supporting the data structure and triggering the implicit registrations, and a S-CSCF indicating basic information to derive access conditions.

FIG. 10 illustrates an exemplary embodiment of possible sequences of actions to explicitly make an IMPU unregistered and deregistered as well as to respectively make corresponding IRSs unregistered and deregistered under respective access conditions.

DETAILED DESCRIPTION

The following describes some preferred embodiments for a HSS holding a flexible data structure per subscriber of the IMS, a method of carrying out the implicit registration of an IRS sharing a given IMPU with another IRS, and a S-CSCF server serving subscribers of the IMS and providing towards the HSS basic information to derive access conditions, they all cooperating to provide a more flexible data structure where any IMPU, even those of the SIP URI type, may be shared by more than one IRS.

FIG. 3 illustrates a scenario where an IMS user may access the IMS 8 through a so-called Fixed-Mobile Convergent network, as already commented above when discussing the drawbacks aiming the present invention. A Fixed-Mobile Convergent network, namely an FMC network, may be understood as a network where a user 91 may get connected with other users 92 via a fixed or wireline network 61-62, or via a mobile, cellular or wireless network 63. Where the user 91 has a wireline connection, the user may connect a desktop PC 9d, an IPTV STB 9c, and a conventional telephone 9b, for example. On the other hand, where such a user 91 is an FMC user, the user may also have a wireless connection through a mobile terminal 9a, where the user might even connect a laptop PC (not illustrated in any drawing) to access the IMS 8 through.

In this exemplary scenario illustrated in FIG. 3, the FMC user 91 is given a first IMPU 2a such as Bob@ims.com, namely IMPU-1, to identify the user in the IMS; a second IMPU 2b such as Bob@wireless, namely IMPU-2, to identify, for example, an e-mail account in the laptop PC connected with the mobile terminal 9a; a third IMPU 2c of a TEL URI type such as +1234567890, namely IMPU-3, to identify the mobile terminal MSISDN for fixed and mobile telephony services; a fourth IMPU 2d such as Bob@wireline, namely IMPU-4, to identify, for example, any user application in the desktop PC 9d or the IPTV STB 9c, both connected with the wireline network; a fifth IMPU 2e of a TEL URI type such as +9876543210, namely IMPU-5, to identify the wireline terminal ISDN number for fixed and mobile telephony services; and a sixth IMPU 2f such as Bob@bobdomain, namely IMPU-6, to identify a user alias in the IMS, for example, an identity related with a work position or with private activities.

Where the present invention addresses the issue of sharing an IMPU of a given user amongst more than one IRS, for example, sharing IMPU-1 by a first IRS with IMPUs in the home environment and a second IRS with IMPUs in the mobile environment, an exemplary data structure such as the one illustrated in FIG. 4 may be provided for the given user.

The data structure illustrated in FIG. 4 includes a first IRS 71, namely IRS-1, to be implicitly registered where the user accesses the IMS 8 through the home environment shown in FIG. 3, that is, through a first access network 61 or through a second access network 62; and a second IRS 72, namely IRS-2, to be implicitly registered where the user accesses the IMS 8 through the mobile environment shown in FIG. 3, that is, through a third access network 63. For the sake of simplicity in respect of the present invention, all IMPUs in both IRS-1 and IRS-2 are associated with a couple of IMPIs of the given user 91, namely IMPI-13a and IMPI-2 3b.

The first IRS 71, namely IRS-1, representing the home environment may thus include the IMPU-12a to be shared, namely Bob@ims.com, identifying the user in the IMS 8, and those IMPUs of the user 91 in the home environment: the IMPU-4 2d, namely Bob@wireline, identifying any user application in the desktop PC 9d or the IPTV STB 9c, and the IMPU-5 2e, namely +9876543210, identifying the wireline terminal 9b ISDN number for fixed and mobile telephony services. In addition, this IRS-1 also includes any other alias IMPU of IMPU-1 such as IMPU-6 2f, namely Bob@bobdomain. This IRS-1 71 also includes, in accordance with the invention, an access condition 41 to be matched in order to carry out the implicit registration of IMPUs in the IRS-1. In this case, the access condition 41 is built up as a result of accessing the IMS 8 through either the first access network 61, or the second access network 62 or both.

Generally speaking, an access condition included in any IRS may be understood as a result of a logic operation (which makes use of traditional logic operators such as AND, OR, NOT, etc) with individual conditions selected from a group of conditions including: a mobile access only, a fixed access only, emergency call, roaming network, individual access networks, and combinations thereof.

Moreover, the IRS-1 also includes a registration status 51 to indicate the registration status applicable for all the IMPUs in said IRS-1. In particular, as shown in FIG. 4, both IMPU-12a and IMPU-6 2f share a unique SP, namely SP-A 6a; whereas both IMPU-4 2d and IMPU-5 2e share a unique SP, namely SP-B 6b. As already commented above, IMPU-1 and IMPU-6 sharing a unique SP and being included in the same IRS are said to be alias IMPUs, as IMPU-4 and IMPU-5 respectively do.

The second IRS 72, namely IRS-2, representing the mobile environment may also include the IMPU-12a to be shared, namely Bob@ims.com, identifying the user in the IMS 8, and those IMPUs of the user 91 in the mobile environment: the IMPU-2 2b, namely Bob@wireless, identifying an e-mail account for the user in the laptop PC connected with the mobile terminal 9a, and the IMPU-3 2c, namely +1234567890, identifying the mobile terminal 9a MSISDN for fixed and mobile telephony services. In addition, this IRS-2 also includes IMPU-6 2f, namely Bob@bobdomain, as alias IMPU of IMPU-1. This IRS-2 72 also includes, in accordance with the invention, an access condition 42 to be matched in order to carry out the implicit registration of IMPUs in the IRS-2. In this case, the access condition 42 may simply include an indicator of accessing the IMS 8 through the third access network 63. Moreover, the IRS-2 72 also includes a registration status 52 to indicate the registration status applicable for all the IMPUs in said IRS-2. In particular, as shown in FIG. 4, both IMPU-12a and IMPU-6 2f share the unique SP, namely SP-A 6a, as for the IRS-1; whereas both IMPU-2 2b and IMPU-3 2c share a unique SP, namely SP-C 6c. As already commented above, IMPU-1 and IMPU-6 sharing a unique SP and being included in the same IRS are said to be alias IMPUs, as IMPU-2 and IMPU-3 respectively do as well.

To this end, the HSS 81 may comprise a storage 13 for storing the data structure per subscriber; a receiver 12 for receiving the explicit registration of the given IMPU-12a under the given access condition 42; and a processor 10 for triggering the implicit registration of IMPUs 2a, 2b, 2c, 2f in the IRS-2 72 associated with said access condition 42. In an embodiment of the invention, the HSS 81 may further comprise a sender 11 for submitting those IMPUs 2a, 2b, 2c, 2f in the IRS-2 72 associated with said access condition 42 as a result of the explicit registration of the given IMPU-12a. In particular, the storage 13 may comprise a memory handler 130 for submitting and retrieving data from an external database 131, where the database is provided by a third party supplier, or may comprise an internal database, not shown in any drawing, cooperating with other functional entities of the HSS 81.

Also to this end, the S-CSCF 82 may include a receiver 22 for receiving an explicit registration of the given IMPU-12a, and a sender 21 for submitting the explicit registration of said IMPU towards HSS 81, wherein this sender 21 may be also arranged for submitting towards the HSS the given access condition for which the explicit registration applies.

In operation, and where a given IMPU is shared by more than one IRS, the explicit registration of said given IMPU under a given access condition triggers the implicit registration of those IMPUs in the IRS associated with said access condition, whilst the registration status of IMPUs in any other IRS, which is associated with a different access condition, remain unchanged. Once the exemplary data structure of FIG.

4 has been defined for a given user 91 in a FMC network as shown in FIG. 3, different sequences of actions can be followed by the user in respect of registrations of IMPI/IMPU pairs in the IMS 8.

FIG. 7 illustrates an exemplary sequence of actions that the user 91 may carry out at in the course of accessing the IMS 8. The user may make use of the mobile terminal 9a to register IMPU-12a, Bob@ims.com, with a SIP Register message in step S-200. Such message reaches the IMS via the third access network 63, and is transmitted through the IMS Core network until reaching a S-CSCF 82 assigned for serving the user. The S-CSCF 82 receiving such message submits during a step S-205 a corresponding explicit registration towards the HSS 81 in charge of the user, likely with a SAR message, providing the IMPU-1 to be registered along with an indication to determine the access condition to be applied.

The HSS 81 receiving such explicit registration of IMPU-1 determines that the IRS-2 72 includes the received IMPU-12a and matches the access condition 42, and triggers the implicit registration of those IMPUs in said IRS-2 72. Then, the HSS submits during a step S-210 to the S-CSCF 82 currently serving the user, likely with a SAA message, those IMPUs in said IRS-2 72 (namely IMPU-1, IMPU-6, IMPU-2 and IMPU-3), likely accompanied by respectively associated SP-A 6a and SP-C 6c and other subscriber data. The submission of SPs and other subscriber data is not significant for the purpose of the invention. Eventually, the user 91 is informed through the mobile terminal 9a, during a step S-215, of the implicit registration of IMPU-1, IMPU-6, IMPU-2 and IMPU-3, likely with a SIP 200 OK message.

The exemplary sequence of actions illustrated in FIG. 7 continues where the user makes use of the desktop PC 9d connected to a fixed line to access the IMS 8. The user 91 carries out during a step S-220 a new explicit registration of IMPU-12a, Bob@ims.com, from the desktop PC 9d with a SIP Register message. The message reaches the IMS via the first access network 61, and is transmitted through the IMS Core network until reaching the S-CSCF 82 assigned for serving the user. As for the previous registration, the S-CSCF 82 receiving such message submits during a step S-225 a corresponding explicit registration towards the HSS 81 in charge of the user, likely with a SAR message, providing the IMPU-1 to be registered along with an indication to determine the access condition to be applied.

In this particular case, the access condition to match is the access through the first access network 61, and the IRS-1 71 in the HSS 81 had been configured with an access condition 41 built up as the result of performing the logic operation: 'access through the first access network 61' OR 'access through the second access network 62'.

The HSS 81 receiving such new explicit registration of IMPU-1 determines that the IRS-1 71 also includes the received IMPU-12a and matches the access condition 41, and triggers the implicit registration of those IMPUs in said IRS-1 71. Then, the HSS submits during a step S-230 to the S-CSCF 82 currently serving the user, likely with a SAA message, those IMPUs in said IRS-1 71 (namely IMPU-1, IMPU-6, IMPU-4 and IMPU-5), likely accompanied by respectively associated SP-A 6a and SP-B 6b and other subscriber data. As before, the submission of SPs and other subscriber data is not significant for the purpose of the invention. Eventually, the user 91 is informed through the desktop PC 9d, during a step S-235, of the implicit registration of IMPU-1, IMPU-6, IMPU-4 and IMPU-5, likely with a SIP 200 OK message.

At the present situation, and following the two implicit registrations of IRS-1 71 and IRS-2 72 carried out at the HSS 81 as a result of the two explicit registrations of the IMPU-12a under different access conditions 41 and 42, the HSS 81 has recorded said two implicit registrations of IRS-1 71 and IRS-2 72 in order to preclude any further partial deregistration of corresponding IMPUs.

To this end, the processor 10 of the HSS 81 may be arranged for recording in the storage 13 the implicit registration of IMPUs in any IRS in order to preclude partial deregistration of IMPUs in said IRS. In particular, the implicit registration of IMPUs in the IRS associated with said access condition.

Before explaining how the user 91 may deregister any currently registered IMPU, some exemplary embodiments of communications between the user 91 and any other user may be presented.

For example, FIG. 8 illustrates an exemplary embodiment where another user 92 initiates a number of calls, or communications, towards the given user 91. Said another user 92 may initiate a communication to reach the given user 91 at home and, particularly, to the wireline terminal 9b since calls to fixed line terminals are usually cheaper than the charging applicable to mobile terminals 9a. To this end, the another user 92 dials +9876543210, namely the IMPU-5, and the call is signalled during a step S-250 towards the S-CSCF 82 currently serving the given user 91. The S-CSCF 82 processes such call signalling and, finding the indicated IMPU-5 amongst those already registered in the HSS, submits during a step S-255 an invitation to communicate towards the wireline terminal 9b identified by the indicated IMPU-5, likely with a SIP Invite message. Simultaneously with this call, or afterwards, the same another user 92 or any other user may want to initiate a communication towards the desktop PC 9d at home of the given user 91. To this end, the another user 92 types the destination address Bob@wireline, namely the IMPU-4, and the call is signalled during a step S-260 towards the S-CSCF 82 currently serving the given user 91. The S-CSCF 82 processes such call signalling and, finding the indicated IMPU-4 amongst those already registered in the HSS, submits during a step S-265 an invitation to communicate towards the desktop PC 9d identified by the indicated IMPU-4, likely with a SIP Invite message.

On the other hand, the same another user 92 or any other user may want to also initiate a communication towards a laptop PC connected to the mobile terminal 9a of the given user 91. To this end, the another user 92 types the destination address Bob@wireless, namely the IMPU-2, and the call is signalled during a step S-270 towards the S-CSCF 82 currently serving the given user 91. The S-CSCF 82 processes such call signalling and, finding the indicated IMPU-2 amongst those already registered in the HSS, submits during a step S-275 an invitation to communicate towards the laptop PC through the mobile terminal 9a identified by the indicated IMPU-2, likely also with a SIP Invite message. Likewise, the same another user 92, or any other user, may want to initiate a phone call towards the mobile terminal 9a of the given user 91. To this end, the another user 92 dials +1234567890, namely the IMPU-3, and the call is signalled during a step S-280 towards the S-CSCF 82 currently serving the given user 91. The S-CSCF 82 processes such call signalling and, finding the indicated IMPU-3 amongst those already registered in the HSS, submits during a step S-285 an invitation to communicate towards the mobile terminal 9a identified by the indicated IMPU-3, likely with a SIP Invite message.

Regarding an unregistered state and deregistered state that any IMPU may have, FIG. 10 illustrates an exemplary embodiment of the flow of actions that may be initiated in accordance with the invention to deregister an IMPU through the mobile terminal 9a, as well as to deregister an IMPU through the desktop PC 9d. As already commented above, just those IMPUs of the SIP URI type can be used during registration procedures, being to make an IMPU get the registered state, unregistered state or deregistered state.

FIG. 10 thus starts with a signalling message submitted from the mobile terminal 9a during a step S-300 instructing the IMS 8 to deregister the IMPU-6 2f, namely Bob@bobdomain. Such message is received at the S-CSCF 82 currently serving the user 91, which forwards a corresponding one during a step S-305 towards the HSS 81, likely with a SAR message indicating said IMPU-6 along with an indication to determine the access condition to be applied, that is, accessing the IMS through the third access network 63. The HSS 81, upon receiving such instruction to deregister the IMPU-6, determines that the IRS-2 72 includes the received IMPU-6 2f and matches the access condition 42, and triggers those IMPUs in said IRS-2 72 being implicitly deregistered. Then, the HSS 81 submits during a step S-310 to the S-CSCF 82 currently serving the user, likely with a SAA message, those IMPUs in said IRS-2 72 (namely IMPU-1, IMPU-6, IMPU-2 and IMPU-3) that have been deregistered. Eventually, the mobile terminal 9a is informed during a step S-315 that IMPU-1, IMPU-6, IMPU-2 and IMPU-3 have been deregistered. Even though not illustrated in any drawing, a similar mechanism may also be applied between the S-CSCF 82 and the HSS 81 to make an IMPU being explicitly unregistered and, subsequently, those IMPUs in the corresponding IRS for the associated access condition being thus implicitly unregistered.

FIG. 10 continues with a signalling message submitted from the desktop PC 9d during a step S-320 instructing the IMS 8 to deregister the IMPU-4 2d, namely Bob@wireline. Such message is received at the S-CSCF 82 currently serving the user 91, which forwards a corresponding one during a step S-325 towards the HSS 81, likely with a SAR message indicating said IMPU-4 along with an indication to determine the access condition to be applied, that is, accessing the IMS through the first access network 61. The HSS 81, upon receiving such instruction to deregister the IMPU-4 2d, determines that the IRS-1 71 includes the received IMPU-4 2d and matches the access condition 41, and triggers those IMPUs in said IRS-1 71 being implicitly deregistered. Then, the HSS 81 submits during a step S-330 to the S-CSCF 82 currently serving the user, likely with a SAA message, those IMPUs in said IRS-1 71 (namely IMPU-1, IMPU-6, IMPU-4 and IMPU-5) that have been deregistered. Eventually, the desktop PC 9d is informed during a step S-335 that IMPU-1, IMPU-6, IMPU-4 and IMPU-5 have been deregistered. Even though not illustrated in any drawing, a similar mechanism may also be applied between the S-CSCF 82 and the HSS 81 to make an IMPU being explicitly unregistered and, subsequently, those IMPUs in the corresponding IRS for the associated access condition being thus implicitly unregistered.

In the above exemplary embodiments, the registration status 51 52 of each IRS adopts a unique value 'registered', 'unregistered' or 'deregistered' applicable to those IMPUs in each IRS 71 72.

To this end, the receiver 12 of the HSS 81 may be arranged for receiving a deregistration of an IMPU in an IRS, or instruction to make the IMPU unregistered, which implicit registration was recorded in the storage 13, and the processor 10 may be arranged for triggering the deregistration of those IMPUs in said IRS, or to make those IMPUs unregistered. Moreover, the receiver 12 may further be arranged for receiving a given access condition along with a deregistration of an IMPU, or the instruction to make it unregistered, and the processor 10 may further be arranged for using the given access condition to determine a deregistration of those IMPUs in an IRS associated with said access condition, or to make them unregistered, as the case might be.

Also to this end, the sender 21 of the S-CSCF 82 may further be arranged for submitting towards the HSS 81, along with a deregistration of an IMPU, a given access condition for which the deregistration applies.

The data structure explained above, whereby a given IMPU can be shared by more than one IRS, each IRS being associated with an access condition, and the explicit registration of the given IMPU, under a given access condition, triggering the implicit registration of those IMPUs in the IRS associated with the given access condition, may well fulfil the above regulatory requirements in the field of Emergency Calls.

In this respect, the exemplary data structure illustrated in FIG. 5 includes a third IRS 73, namely IRS-3, to be implicitly registered where the user accesses the IMS 8 for an emergency call through the home environment shown in FIG. 3, that is, through a first access network 61 or through a second access network 62; and a fourth IRS 74, namely IRS-4, to be implicitly registered where the user accesses the IMS 8 for an emergency call through the mobile environment shown in FIG. 3, that is, through a third access network 63. For the sake of simplicity in respect of the present invention, all IMPUs in both IRS-3 and IRS-4 are also associated with the same couple of IMPIs of the given user 91 as before, namely IMPI-1 3a and IMPI-2 3b.

Where the regulatory requirements impose a dedicated IMPU to be registered for Emergency Calls, a so-called Emergency IMPU (hereinafter E-IMPU), such E-IMPU may be shared, in accordance with the present invention, by every IRS wherein the emergency is included as, at least part of, the access condition.

This third IRS 73 of the data structure, namely IRS-3 usable for emergency calls from the home environment, includes the E-IMPU 2g usable for registration of an emergency call, and may also include the IMPU-12a, namely Bob@ims.com, identifying the user in the IMS 8, and those IMPUs of the user 91 in the home environment: the IMPU-4 2d, namely Bob@wireline, and the IMPU-5 2e, namely +9876543210. In addition, this IRS-3 may also include IMPU-6 2f, namely Bob@bobdomain, as alias IMPU of IMPU-1. This IRS-3 73 also includes, in accordance with the invention, an access condition 43 to be matched in order to carry out the implicit registration of IMPUs in the emergency IRS-3.

In this case, the access condition 43 is built up as the result of performing the logic operation: 'emergency call' AND ['access through the first access network 61' OR 'access through the second access network 62'].

As for the previous IRS-1, the emergency IRS-3 also includes a registration status 53 to indicate the registration status applicable for all the IMPUs in said IRS-3. In particular, as shown in FIG. 5, both IMPU-12a and IMPU-6 2f share a unique SP, namely SP-A 6a; whereas both IMPU-4 2d and IMPU-5 2e share a unique SP, namely SP-B 6b. The E-IMPU may be simply associated with a sort of default profile 6d, namely SP-null, since no particular service capabilities are used for emergency calls, other than being used to trigger the implicit registration of IMPUs in the emergency IRS-3 or IRS-4, and especially those of the TEL URI type usable for call-back purposes.

The FIG. 5 also illustrates the fourth IRS 74 of the data structure, namely IRS-4 usable for emergency calls from the mobile environment. This IRS-4 74 also includes the E-IMPU 2g usable for registration of an emergency call, and may also include the IMPU-12a, namely Bob@ims.com, identifying the user in the IMS 8, and those IMPUs of the user 91 in the mobile environment: the IMPU-2 2b, namely Bob@wireless, and the IMPU-3 2c, namely +1234567890. In addition, this IRS-4 may also include IMPU-6 2f, namely Bob@bobdomain, as alias IMPU of IMPU-1. This IRS-4 74 also includes, in accordance with the invention, an access condition 44 to be matched in order to carry out the implicit registration of IMPUs in the emergency IRS-4.

In this case, the access condition 44 is built up as the result of performing the logic operation: 'emergency call' AND 'access through the third access network 63'.

As for the previous IRS-2, the emergency IRS-4 also includes a registration status 54 to indicate the registration status applicable for all the IMPUs in said IRS-4. In particular, as shown in FIG. 5, both IMPU-12a and IMPU-6 2f share a unique SP, namely SP-A 6a; whereas both IMPU-2 2b and IMPU-3 2c share a unique SP, namely SP-C 6c. The E-IMPU may be simply associated, as in IRS-3, with a sort of default profile 6d, namely SP-null, since no particular service capabilities are used for emergency calls other than allowing the implicit registration of IMPUs of the TEL URI type usable for call-back purposes.

In operation, FIG. 6 illustrates an exemplary embodiment of the user 91 making an emergency call through the mobile terminal 9a via the IMS 8. The sequence of actions starts with an explicit registration of the E-IMPU carried out during a step S-100 through the mobile terminal 9a. Such message reaches the IMS via the third access network 63, and is transmitted through the IMS Core network until reaching a S-CSCF 82 assigned for serving the user. The S-CSCF 82 receiving such message submits during a step S-105 a corresponding explicit registration towards the HSS 81 in charge of the user, likely with a SAR message, providing the E-IMPU 2g to be registered along with an indication to determine the access condition to be applied.

The HSS 81 receiving such explicit registration of the E-IMPU determines that the IRS-4 74 includes the received E-IMPU 2g and matches the access condition 44, and triggers the implicit registration of those IMPUs in said IRS-4 74. Then, the HSS submits during a step S-110 to the S-CSCF 82 currently serving the user, likely with a SAA message, those IMPUs in said IRS-4 74 (namely IMPU-1, IMPU-6, IMPU-2 and IMPU-3), or at least those of the TEL URI type (IMPU-3: +1234567890), likely accompanied by respectively associated SP-A 6a and SP-C 6c and other subscriber data. As already commented above, the submission of SPs and other subscriber data is not significant for the purpose of the invention. Eventually, the user 91 is informed through the mobile terminal 9a, during a step S-115, of the implicit registration of IMPU-1, IMPU-6, IMPU-2 and IMPU-3, likely with a SIP 200 OK message or the like.

The exemplary sequence of actions illustrated in FIG. 7 continues where the user makes the emergency call towards an Emergency Call Session Control Function 83 (hereinafter E-CSCF) during a step S-120. Such emergency call always includes a TEL URI identifying a user terminal, or user equipment, where the user is reachable: in this case, the IMPU-3. Then, the E-CSCF forwards such emergency call towards the ERC 93 during a step S-125. Whenever the ERC 93 needs to communicate with the user 91, for example during a step S-130, it initiates a call back making use of the received TEL URI addressing the user, namely IMPU-3. Such call back is signalled towards the S-CSCF 82 serving the user, as for any conventional incoming call, and the S-CSCF forwards such call back signalling towards the mobile terminal 9a currently in use by the user 91.

Regarding implementation of embodiments, the invention can be practised by a computer program, which is loadable into an internal memory of a computer that includes input and output units as well as a processing unit. This computer program comprises executable code portions adapted to carry out sequences of actions described under the above embodiments when running in the computer. In particular, the computer program may be recorded in a carrier computer-readable medium, such as a CD-ROM.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A Home Subscriber Server (HSS) holding subscriber data of users of an Internet protocol Multimedia Subsystem (IMS), the HSS having a data structure stored on a non-transitory computer readable medium per subscriber that includes a plurality of IMS Public User Identities, each IMS Public User Identity (IMPU) associated with at least one IMS Private User Identity (IMPI), wherein a number n of IMPUs is distributed in a number m of Implicit Registration Sets, and wherein all the IMPUs in each Implicit Registration Set (IRS) share a same registration status, wherein each IRS is associated with an access condition, a given IMPU is shared by more than one IRS, and an explicit registration of the given IMPU under a given access condition triggers an implicit registration of the IMPUs in the IRS associated with the given access condition, wherein a registration status of IMPUs in any other IRS remain unchanged.

2. The HSS of claim 1, wherein an explicit registration of an IMPU, which belongs only to one IRS, triggers an implicit registration of the IMPUs in the IRS for an associated access condition.

3. The HSS of claim 1, wherein the given access condition is selected from a group of access conditions that includes a mobile access only, a fixed access only, emergency call, roaming network, and combinations thereof.

4. The HSS of claim 1, wherein the implicit registration of IMPUs in the IRS associated with the given access condition is recorded in order to preclude partial deregistration of the IMPUs in the IRS.

5. The HSS of claim 2, wherein the implicit registration of IMPUs in the IRS is recorded in order to preclude partial deregistration of the IMPUs in the IRS.

6. The HSS of claim 4, wherein a deregistration of an IMPU in the IRS, which implicit registration was recorded, triggers the deregistration of the IMPUs in the IRS.

7. The HSS of claim 1, further comprising a receiver for receiving the explicit registration of the given IMPU under the given access condition and a processor for triggering the implicit registration of IMPUs in the IRS associated with the given access condition.

8. The HSS of claim 7, further comprising a sender for submitting the IMPUs in the IRS associated with the given access condition as a result of the explicit registration of the given IMPU.

9. The HSS of claim 7, wherein the processor is arranged for recording the implicit registration of IMPUs in the IRS associated with the given access condition in order to preclude partial deregistration of IMPUs in the IRS.

10. The HSS of claim 7, wherein the processor is arranged for recording the implicit registration of IMPUs in the IRS in order to preclude partial deregistration of IMPUs in the IRS.

11. The HSS of claim 9, wherein the receiver is arranged for receiving a deregistration of an IMPU in an IRS, and the processor is arranged for triggering the deregistration of the IMPUs in the IRS.

12. The HSS of claim 7, wherein the receiver is further arranged for receiving a given access condition along with a deregistration of an IMPU, and the processor is further arranged for using the given access condition to determine a deregistration of the IMPUs in an IRS associated with the given access condition.

13. The HSS of claim 7, further comprising a memory handler for submitting and retrieving data from an external database.

14. A method of carrying out an implicit registration of one Implicit Registration Set (IRS) amongst a plurality of IRSs operable on a processor of a Home Subscriber Server (HSS), each IRS comprising more than one Internet protocol Multimedia Subsystem (IMS) Public User Identity (IMPU) and the IMPUs in each IRS sharing a same registration status, the method comprising:
   distributing a number n of IMPUs in a number m of IRSs;
   sharing a given IMPU by more than one IRS;
   associating each IRS with an access condition;
   carrying out an explicit registration of the given IMPU under a given access condition; and
   triggering an implicit registration in the HSS of the IMPUs in an IRS associated with the given access condition, whilst a registration status of IMPUs in any other IRS remain unchanged.

15. The method of claim 14, further comprising carrying out an explicit registration of a second IMPU, which belongs only to one IRS, and responsive to the carrying out the explicit registration of the second IMPU, triggering an implicit registration of IMPUs in the IRS for an associated access condition.

16. The method of claim 14, wherein the given access condition is selected from a group of access conditions that includes a mobile access only, a fixed access only, emergency call, roaming network, and combinations thereof.

17. The method of claim 14, further comprising recording the implicit registration of IMPUs in the IRS associated with the given access condition in order to preclude partial deregistration of the IMPUs in the IRS.

18. The method of claim 15, further comprising recording the implicit registration of IMPUs in the IRS in order to preclude partial deregistration of the IMPUs in the IRS.

19. The method of claim 17, further comprising deregistering the IMPUs in an IRS, which implicit registration was recorded, upon a deregistration of an IMPU in the IRS.

20. The method of claim 14, further comprising receiving a given access condition along with a deregistration of an IMPU, and using the given access condition to determine a deregistration of the IMPUs in an IRS associated with the given access condition.

21. A Serving Call Session Control Function (S-CSCF) server serving subscribers of an Internet protocol (IP) Multimedia Subsystem (IMS), the S-CSCF server having a receiver for receiving an explicit registration of an IMS Public User Identity (IMPU) of a given subscriber, the IMPU being shared by more than one Implicit Registration Set (IRS), each IRS being associated with an access condition, and a sender for submitting the explicit registration of the IMPU towards a Home Subscriber Server (HSS) holding subscriber data for users of the IMS, wherein the sender is arranged for submitting a given access condition for which the explicit registration applies.

22. The S-CSCF server of claim 21, wherein the given access condition is selected from a group of access conditions that includes a mobile access only, a fixed access only, emergency call, roaming network, and combinations thereof.

23. The S-CSCF server of claim 21, wherein the sender is further arranged for submitting towards the HSS, along with a deregistration of an IMPU, a given access condition for which the deregistration applies.

\* \* \* \* \*

UNITED STATES PATENT AND TRADEMARK OFFICE
CERTIFICATE OF CORRECTION

| | |
|---|---|
| PATENT NO. | : 8,582,563 B2 |
| APPLICATION NO. | : 12/738903 |
| DATED | : November 12, 2013 |
| INVENTOR(S) | : Blanco et al. |

It is certified that error appears in the above-identified patent and that said Letters Patent is hereby corrected as shown below:

On the Title Page, item (57), under "ABSTRACT", in Column 2, Line 12, delete "while" and insert -- whilst --, therefor.

In the Specification

In Column 7, Line 47, delete "IMPI-13a" and insert -- IMPI-1 3a --, therefor.

In Column 7, Line 49, delete "IMPU-12a" and insert -- IMPU-1 2a --, therefor.

In Column 8, Lines 7-8, delete "IMPU-12a" and insert -- IMPU-1 2a --, therefor.

In Column 8, Line 15, delete "IMPU-12a" and insert -- IMPU-1 2a --, therefor.

In Column 8, Line 32, delete "IMPU-12a" and insert -- IMPU-1 2a --, therefor.

In Column 8, Line 41, delete "IMPU-12a" and insert -- IMPU-1 2a --, therefor.

In Column 8, Line 48, delete "IMPU-12a." and insert -- IMPU-1 2a. --, therefor.

In Column 8, Line 56, delete "IMPU-12a," and insert -- IMPU-1 2a, --, therefor.

In Column 9, Line 8, delete "IMPU-12a," and insert -- IMPU-1 2a, --, therefor.

In Column 9, Line 18, delete "IMPU-12a" and insert -- IMPU-1 2a --, therefor.

In Column 9, Line 35, delete "IMPU-12a," and insert -- IMPU-1 2a, --, therefor.

In Column 9, Line 53, delete "IMPU-12a" and insert -- IMPU-1 2a --, therefor.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,582,563 B2

In Column 9, Line 67, delete "IMPU-12a" and insert -- IMPU-1 2a --, therefor.

In Column 12, Lines 26-27, delete "IMPI-13a" and insert -- IMPI-1 3a --, therefor.

In Column 12, Line 37, delete "IMPU-12a," and insert -- IMPU-1 2a, --, therefor.

In Column 12, Line 54, delete "IMPU-12a" and insert -- IMPU-1 2a --, therefor.

In Column 12, Line 67, delete "IMPU-12a," and insert -- IMPU-1 2a, --, therefor.

In Column 13, Line 15, delete "IMPU-12a" and insert -- IMPU-1 2a --, therefor.